United States Patent
Baker

(10) Patent No.: US 7,240,336 B1
(45) Date of Patent: Jul. 3, 2007

(54) INTERPRETIVE SIMULATION OF SOFTWARE DOWNLOAD PROCESS

(75) Inventor: Steven E. Baker, Huntsville, AL (US)

(73) Assignee: SCI Systems, Inc., Huntsville, AL (US)

( * ) Notice: Subject to any disclaimer, the term of this patent is extended or adjusted under 35 U.S.C. 154(b) by 391 days.

(21) Appl. No.: 09/624,831

(22) Filed: Jul. 25, 2000

(51) Int. Cl.
G06F 9/44 (2006.01)
G06F 9/445 (2006.01)

(52) U.S. Cl. .................. 717/135; 717/174

(58) Field of Classification Search ........ 717/101–103, 717/124, 126–129, 134–139, 141, 109, 113, 717/125, 168–178; 702/119, 123, 185; 703/23–28; 714/30–57

See application file for complete search history.

(56) References Cited

U.S. PATENT DOCUMENTS

| | | | |
|---|---|---|---|
| 5,371,883 A | 12/1994 | Gross et al. | |
| 5,675,803 A | 10/1997 | Preisler et al. | |
| 5,748,966 A | 5/1998 | Sato | |
| 5,754,860 A | 5/1998 | McKeeman et al. | |
| 5,822,589 A | 10/1998 | Diamant et al. | |
| 5,832,271 A | 11/1998 | Devanbu | |
| 5,835,777 A | 11/1998 | Staelin | |
| 5,844,823 A | 12/1998 | Mishra | |
| 5,854,924 A * | 12/1998 | Rickel et al. | 717/132 |
| 5,881,236 A | 3/1999 | Dickey | |
| 5,991,533 A | 11/1999 | Sano et al. | |
| 5,991,543 A * | 11/1999 | Amberg et al. | 717/175 |
| 6,308,321 B1 * | 10/2001 | Schooler | 717/132 |
| 6,347,397 B1 * | 2/2002 | Curtis | 717/170 |
| 6,418,444 B1 * | 7/2002 | Raduchel et al. | 707/103 Z |
| 6,490,721 B1 * | 12/2002 | Gorshkov et al. | 717/130 |
| 6,516,460 B1 * | 2/2003 | Merks et al. | 717/124 |
| 6,543,047 B1 * | 4/2003 | Vrhel et al. | 717/121 |
| 2001/0037492 A1 * | 11/2001 | Holzmann | 717/4 |
| 2002/0046393 A1 * | 4/2002 | Leino et al. | 717/7 |
| 2003/0154468 A1 * | 8/2003 | Gordon et al. | 717/143 |
| 2003/0182645 A1 * | 9/2003 | Fairbanks | 716/5 |

OTHER PUBLICATIONS

Bernadete Houghton, Macromedia Flash 3, 6/1999, PC Update, pp. 1-4.*
Papachristou et al., "Microprocessor Based Testing for Core-Based System on a Chip", 1999, ACM 1-58113-092-9/99/0006.*

* cited by examiner

Primary Examiner—Tuan Dam
Assistant Examiner—Andre R Fowlkes
(74) Attorney, Agent, or Firm—Perkins Coie LLP

(57) ABSTRACT

The present invention is a method and system designed to be used in a manufacturing environment to ensure the integrity of a manufacturing tool that downloads customer ordered software to personal computers. The present invention creates a computer environment in a lab setting that mimics the computer environment created in the manufacturing arena. The system and method then simulates the steps employed to download the software to a personal computer in a controlled environment to predetermine errors that may be encountered when the process is implemented in the manufacturing arena. This invention dynamically generates a file that contains instructions that when executed download and install customer ordered software to a target computer on the manufacturing floor. This invention then interprets the generated file in accordance with a set of evaluation rules such that the outcome of the execution of the file is determined. An analysis and report is then provided, so that the behavior of the download process can be evaluated for errors that may occur during the download process.

20 Claims, 5 Drawing Sheets

FLOWCHART
HIGHEST LEVEL

ARCHITECTURAL DIAGRAM OF
MANUFACTURING FLOOR
SOFTWARE DOWNLOAD PROCESS

ARCHITECTURE OF SOFTWARE
DOWNLOAD SIMULATION

SOFTWARE TREE EXAMINED BY
SIMULATION PROCESS

FLOWCHART
HIGHEST LEVEL

STEPS COMPRISING STEP 520
IN Fig. 4

INTERPRETIVE SIMULATION OF SOFTWARE DOWNLOAD PROCESS

BACKGROUND OF THE INVENTION

1. Field of Invention

This invention relates to a software simulation of a computer factory's automated system that downloads and installs purchased software packages to a computer being manufactured. This simulation allows the factory's automated software delivery system to be tested prior to implementation in a manufacturing environment. The invention simulates the manufacturing environment so that problems that would be encountered during the manufacturing process can be quickly corrected prior to being implemented on the manufacturing floor.

2. Description of the Prior Art

One stage in the manufacturing of a computer involves installing the appropriate software packages on the hard drive of the system. In this stage, operating system software, software required to drive the various hardware components, and application software are installed. Specifically, a personal computer is loaded with software applications according to a customer order. The nature of a personal computer (P.C.) requires that the software and components installed on the P.C. be configurable to a customer's needs. In other words, a customer may order a specific type of modem, hard drive, random access memory (RAM), monitor, and other hardware devices. Further, a customer may require a specific operating system such as Windows 2000, or another specific operating system. Depending upon the use of which the customer is going to make of the P.C., various software applications are required. The configurable nature of the P.C. dictates that the manufacturing process of customer configurable P.C.'s to be able to handle lot sizes of one.

In order for a manufacturing entity to be able to tailor a P.C. to a customer order, there exists a need for the installed software on each P.C. in a customer order to be configured on the manufacturing floor without human intervention. The most effective way to configure a P.C. is to use an automated process that downloads and installs software packages to each individual P.C. and further does various quality checks on the P.C. itself in order to determine that each hardware option is installed correctly. This installation should correspond to the customer order of the P.C. Traditionally, this process has been automated. The problem, however, is that inserting new models and options into the automated process requires extensive engineering man-hours to properly test these changes before they can be released to the manufacturing floor.

This invention relates to a software download installation simulation. The process that is undergone on the manufacturing floor, is simulated by this invention. The simulation is performed in a testing environment or lab environment in order to determine whether the installation will be successful on the manufacturing floor. Not only does this invention create a more efficient manufacturing process, but this process also creates a more effective maintenance arena with respect to software reuse. This type of testing environment also creates a more cost-effective mode of testing the software download process prior to implementing the process in the manufacturing environment because it requires fewer engineering man-hours than the conventional manual method of testing a download system.

A target computer is the computer being manufactured onto which software must be loaded to conform to customer specifications. At a given time on the manufacturing floor there exists a plurality of target computers onto which a plurality of target-specific customer specified software packages must be loaded.

The plurality of target computers are communicatively linked to a file server via a network, a direct connection or any other type of communications link known in the art. The file server can be a computer server of any type of platform, including but not limited to DOS, UNIX, or Windows™.

A master token file resides on the file server. This master token file contains a list of all models and corresponding options that are available for download to a target system. Each model entry in the master token file is associated with a list of directives which, when executed will install specific software onto the associated model. The master token file is copied from the server to the plurality of target computers via the communication link between the server and the plurality of target computers. Each target computer receives a master token file copied from the server. This file can be sent to the target computers via FTP, a command line copy, or any other transferring mechanism available.

An informative file, an electronic traveler, resides on each target computer. The electronic traveler is responsible for recording the customer's order. Specifically, a reserved word is followed by a model type in the electronic traveler. The electronic traveler can contain other information about the specific requirements of the customer order. However, for the automated software download process to work, a model type must be indicated. Optionally, if one or more factory installed options have been ordered, then they are listed in the electronic traveler as well.

After the master token file is copied to the target computer, an independent process creates a master batch file that is responsible for actually downloading, installing and checking the software deliverables. This master batch file is created by converging the model type information contained in the electronic traveler with the information contained in the master token file. This master batch file contains command lines that copy and execute the installation batch files for the ordered software packages. The master batch file begins the process of downloading the software. The master batch file originates a recursive process that installs each customer-requested software package onto the target computer. Each installation batch file is called in turn. These installation batch files branch out and execute programs that retrieve and install application software.

The problem with this process is that it must be fully executed to be tested. It must be executed in the lab for debugging. It must then be executed again on the manufacturing floor prior to its release acceptance. If an error were encountered in the sequential process of installing the various software modules on the target computer, the process would have to be stopped, and the error would then have to be fixed. Once the problem was fixed, the sequential process that installs the software on the target computer would then have to start over. After starting over, the process may get somewhat further in the installation procedure, however, it may run into another error. Again, the process would have to be stopped, and the problem would have to be fixed. The process would then have to be started over. This form of download testing must complete successfully before releasing it to the manufacturing department. The manufacturing department must successfully repeat the test on at least one target computer before releasing the process to general production. Manufacturing's test is designed to ensure that all of the software components of the download system are available to the target computers from manufacturing's array of download servers. When orders for a new product are released to manufacturing to be built, any flaw in the automated process will stop the factory. The down-time on the manufacturing line associated with not performing this type of test sequence has a detrimental impact on the cost associated with building these target computers for customer delivery. The only way to avoid this down-time is through exhaustive testing which often leads to missing contractually obligated deadlines. A new process is needed to reduce the hours and days involved in the iterative debugging process.

This invention creates, in a lab environment, a simulation of the software installation on the target computers for any specific combination of model and factory installed options. The testing environment is used to predetermine errors or problems that may occur in the download process. This predetermination, because it is confined to a lab environment or testing environment, does not create manufacturing floor down-time. Since the predetermination typically takes place in less than five minutes, hours of repetitive test downloading can be saved. Consequently, employing the simulation to predetermine the reliability of the installation process creates considerable manufacturing cost savings.

The simulation is a process that determines the reliability and viability of the master batch file and all batch files that are recursively called from it. Prior to implementing a new software installation batch file in the manufacturing environment, the master batch file is tested by the simulation before beginning a download test.

SUMMARY OF THE INVENTION

The present invention is a system and method of testing an automated software installation process. The process tested is used to custom load individual computer systems with end user specified software configurations. The invention simulates this process in order to discover errors and potential problems with the installation procedure before the procedure is used in production. These errors and problems can then be addressed in an efficient manner, avoiding the time and expense associated with curing such problems by using an iterative process of performing and then modifying the installation procedure. The simulation follows the steps an actual installation process would in a production environment. A dynamically created instruction file is created which is dependent on the end user software specifications and model of the computer. These instructions are checked to ensure that they can be successfully completed in the production environment. This test includes checking the flow integrity of the instructions, syntax of the instructions, resource integrity of the target computer, network integrity, and other management information systems utilized during the installation process.

DETAILED DESCRIPTION OF INVENTION

Figure 1:
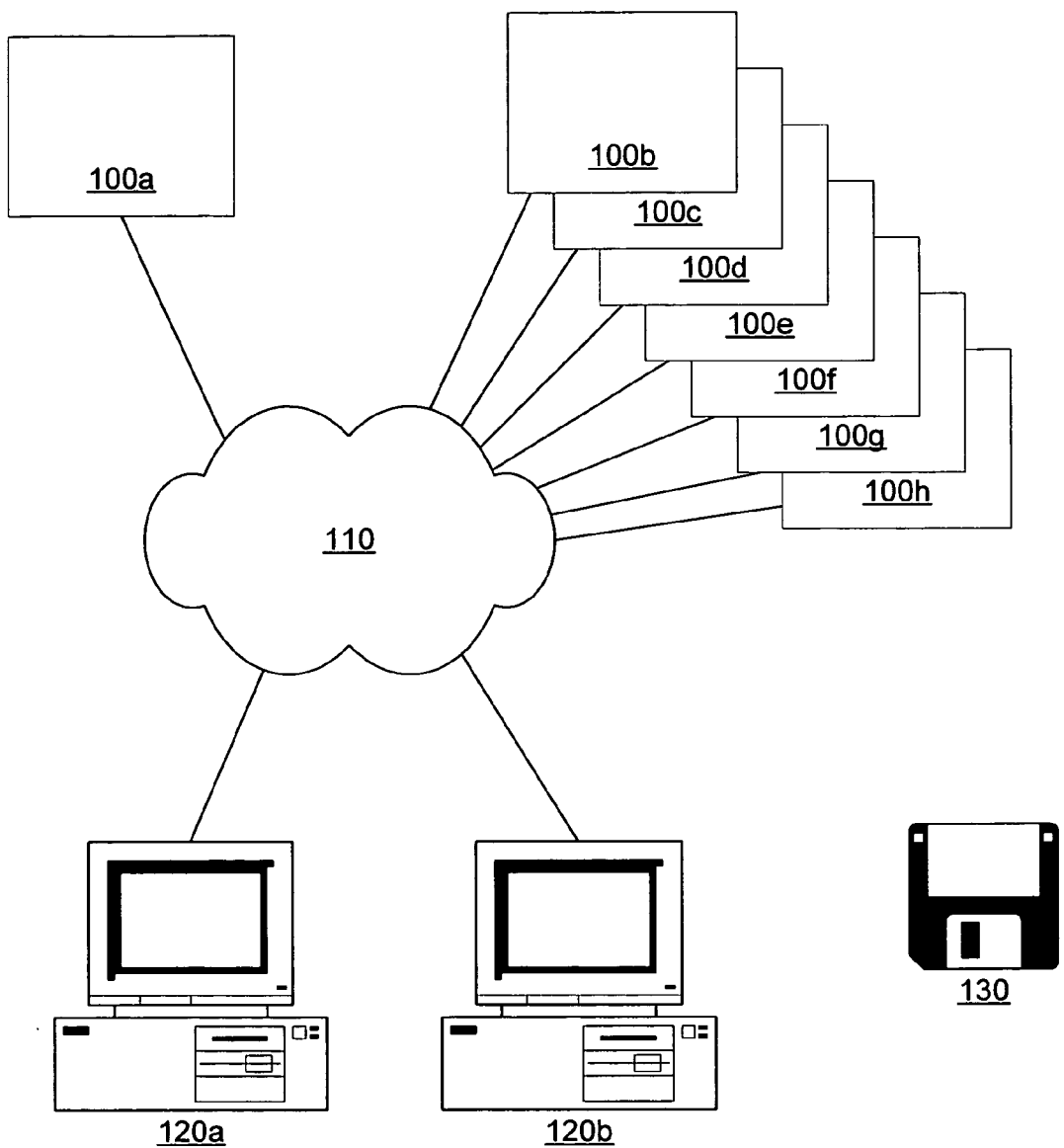
FIG. 1 Architectural Diagram of Manufacturing Floor Software Download Process FIG. 2 Architecture of Software Download Simulation FIG. 3 Example of a Software Tree Examined by Simulation Process FIG. 4 Highest Level Flowchart of System Software FIG. 5 Steps Comprising Step 520

This invention employs technical elements necessary to simulate the manufacturing floor software download process. The architecture of the system employed on the manufacturing floor is illustrated in FIG. 1. The software download system comprises at least one file server 100a, a network 110, at least one target computer 120a, and a diskette 130.

In the manufacturing environment, a diskette 130 is placed into a floppy drive on the target computer 120a. The diskette contains an electronic traveler that contains information necessary to determine the software to be downloaded from the file server 100a. The target computer 120a logs onto a file server 100a and obtains all necessary information required for the software download from the file server 100a to the target unit 120a. This information includes batch files, scripts, and application software. The application software can be either in a compressed or uncompressed format. However, if the application software is in a compressed format, then a corresponding decompression software application must be downloaded to the target computer and the compressed software is then decompressed and written to the hard drive of the target computer 120a.

An effective implementation of this system comprises a plurality of file servers as illustrated in FIG. 1. For example, the system can comprise file servers 100a, 100b, 100c, 100d, 100e, 100f, 100g, and 100h. This will allow a greater number of target computers to be loaded with software.

The simulation tests the integrity of the software download process by examining several independent domains or areas: 1) Flow integrity of the batch files, 2) Resource integrity of the target computer, 3) Error reporting integrity, 4) Network integrity, and 5) Other Management Information Systems (MIS) and Diagnostic Systems.

These domains are general in nature. Through the use of configuration files maintained by an engineer, the specifics of the engineer's resources, error reporting needs, network architecture and other MIS systems, the simulation can address the specifics of his installation by applying its internal rules to his unique environment. These simulated areas are discussed in detail herein.

The Disk Space Simulation

In order to simulate the disk space utilization, the engineer enters into a configuration file a number corresponding to the maximum amount of disk space that each drive letter can hold. This amount is referred to as the disk space fatal limit for each Unit Under Test (the UUT). The simulation detects when a batch file copies a target file from any location to the UUT. The simulation then examines this source file (usually on the network) and determines how much disk space it takes up. Subsequently, the original name of this file, the target name of this file, the target drive letter and the amount of disk space the file uses is added to a linked list. It then adds that amount to its internal current disk space used variable for that particular drive. If this number is greater than the peak disk space used variable, then the peak number is set equal to the current number. If the amount in the current disk space used variable is now greater than the disk space fatal limit for that drive letter, then a fatal error is generated.

Similarly, the engineer enters a number corresponding to the recommended maximum amount of disk space that each drive letter can hold. This number is usually slightly less than the disk space fatal limit. This is called the disk space warning limit for each Unit Under Test (the UUT) drives in the configuration file. If the amount in the current disk space used variable is now greater than the disk space warning limit for that drive letter, then a warning error is generated.

If a file is deleted from the UUT, then the deleted file's information is looked up in the linked list. The current disk space used variable for this drive has the size of this file subtracted from it. Then the node in the linked list is marked as deleted. Later, after the batch files are completely processed, we examine the list to determine which files are remaining on each of the UUT's drives. A report is generated detailing the ending value of the peak disk space used and the current disk space used. This information is then used to ensure that we return to the manufacturing process as much free disk space as we can and to ensure that no temporary files are left on the UUT's hard drives.

Since the batch file is processed sequentially by the simulation, these numbers are an upper bound on the amount of disk space used.

The Environment Space Simulation

The engineer enters into a configuration file a number corresponding to the maximum amount of environment space that a UUT can address. This is called the environment space fatal limit. The simulation detects when a batch file sets an environment variable, examines this environment variable to determine how much memory it takes up, then adds the name of this environment variable, the contents of this environment variable and their sizes to a linked list. It then adds those amounts to its internal current environment space used variable. If this number is greater than the peak environment space used variable, then the peak number is set equal to the current number. If the amount in the current environment space used variable is now greater than the environment space fatal limit, then a fatal error is generated.

Similarly, the engineer enters a number corresponding to the recommended maximum amount of environment space that the UUT can address. This number is usually slightly less than the environment space fatal limit. This is called the environment space warning limit for the UUT. If the amount in the current environment space used variable is now greater than the environment space warning limit, then a warning error is generated.

If an environment variable is deleted, then the information is looked up in the linked list. The current environment space used variable has the size of this variable and its contents subtracted from it. Then the node in the linked list has the variable contents deleted, but not the variable name. Later, after the batch files are completely processed this information is examined to determine the state of the remaining environment variables. A list of the variables and their status is then printed into a report. All of this is done to make sure that we return to the manufacturing process as much free environment space as we can.

Since the batch file is processed sequentially by the simulation, these numbers are an upper bound on the amount of environment space used.

The Network Integrity Check

The simulation performs all of its tests on one set of batch files on a network server. The server on which the test is performed is the Primary Server. Since there can be several other servers, called Secondary Servers, that should contain exactly the same set of files, the simulation does not again perform its integrity check on the mirrored servers. As the simulation encounters each copy command, it checks the date, time and size of the file being copied to the UUT. It compares those numbers to the date, time and size of the same file name on each of the Secondary Servers. If there are any differences, an error report is generated.

The Batch File Flow Check

The simulation processes the batch file in two passes in order to check the Batch File Flow characteristics. The first pass reads the labels in the batch file into a linked list. The second pass examines all goto commands. Each label from pass one (1) must have at least one corresponding goto or a 'Label Not Used' warning will be generated. If a label occurs on a lower line number than the goto command, a 'Backwards Flow' warning will be generated. If a goto command is trying to jump to a label that is not in the list, a 'Label Not Found' fatal error will be generated. If more than one label in the list is identical, a 'Duplicate Label' error will be generated. If a label is longer than the eight significant digits that DOS recognizes, but there is no other label having the same first eight characters, then a 'Label Too Long' warning will be generated. If a label is longer than the eight significant digits that DOS recognizes, and there is another label having the same first eight characters, then a 'Significant Part Conflicts With Another Label' fatal error will be generated.

The MIS System Interface Check

Some environment variables are reserved for use by interfaces to other management information systems that gather data from the manufacturing process. These interfaces look for these variables and look their contents up in databases. If no match is found in the database, then no data can be reported. The simulation examines the batch files for the reserved environment variables and looks them up in the database. If no match is found, an error is reported. This prevents large amounts of data from being lost during the manufacturing process.

The examination described occurs prior to performing test downloads in order to release the new code to the manufacturing floor. The objective of the interpretive simulation is to step through each piece of the process to determine code consistency, errors and possible errors encountered in the process, so that the findings can be addressed prior to beginning the download testing.

Figure 2:
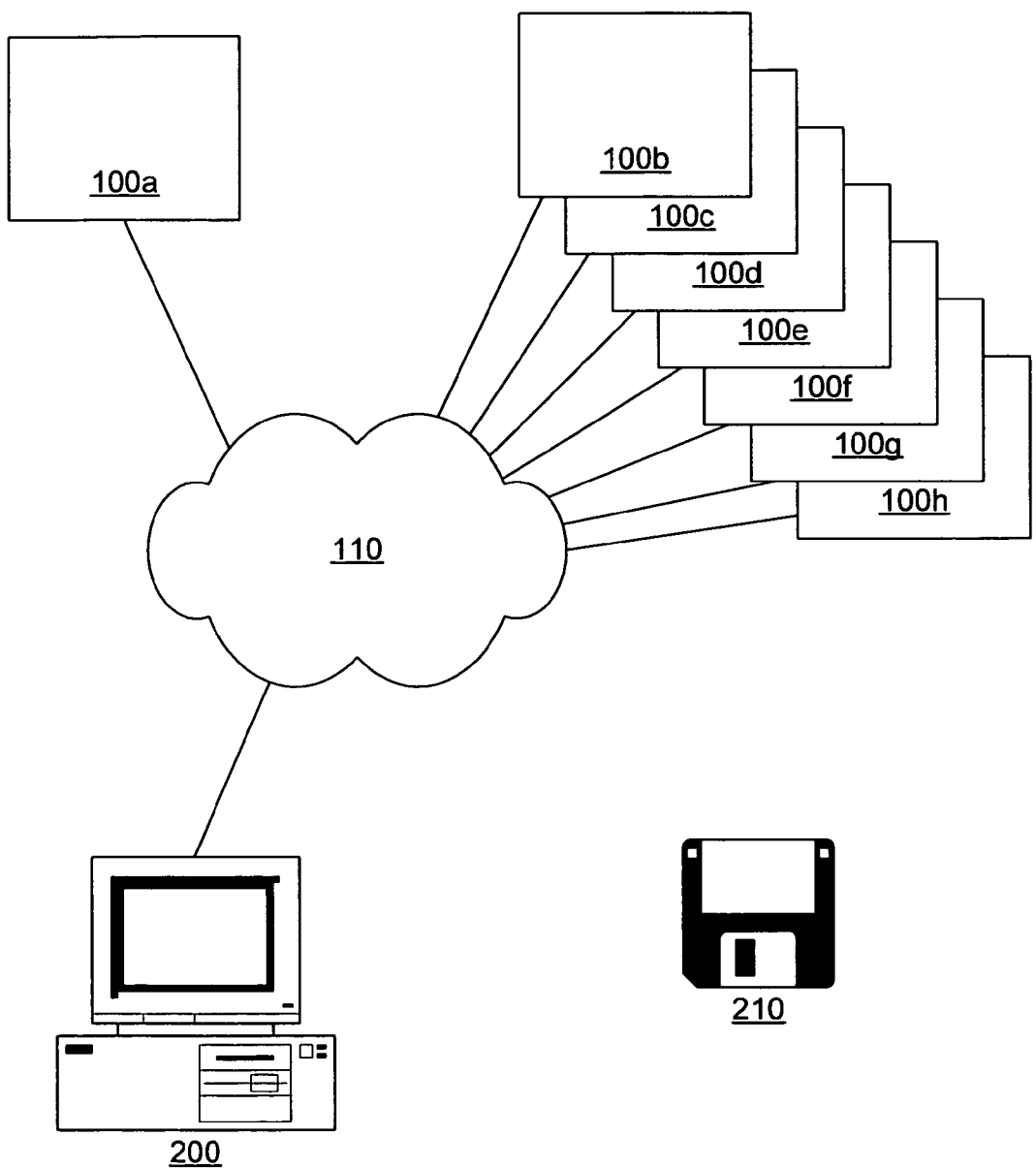

The system and method of the present invention is now described with reference to FIG. 2. The basic architectural components of the simulation system comprises a file server 100*a*, a network 110, a simulation unit 200 and a diskette 210.

In the lab environment a simulation computer 200 is connected to a network 110. On the network reside at least one file server 100*a* used in the manufacturing floor software download process, as described above. A file server 100*a*, for purposes of this invention, contains scripts, batch files, software applications, and other software necessary to prepare a target unit on the manufacturing floor with software in accordance with a customer order.

All software necessary to boot the target unit is placed on a diskette. This diskette is then inserted into the target unit. The software necessary to connect to a file server and start the download process is also written to this diskette. This includes an Electronic Traveler, which is a text file that identifies the model of the target unit and lists any Factory Installed Options (FIOs) requested by the customer.

The interpretative simulation process begins by setting up on the simulation computer 200 an environment that mimics the target computer 120*a* as described above and illustrated in FIG. 1. The simulation computer has access to all of the file servers 100*a*–100*h* in the download. A diskette 210 is placed into the floppy drive of the simulation computer 200. The diskette contains an electronic traveler similar to the electronic traveler on the target computer in the manufacturing process.

An electronic traveler can be any type of data file that identifies the model of the target computer for which the download process needs to be tested. A preferred embodiment of this data file is a text file with a reserved word corresponding to a key word. A reserved word is a consistent identifier that alerts an accessing process of the text file of the correct line on which to find the correct key word or token. For example, in each and every Electronic Traveler, the reserved word or symbol can be any unique, alphanumeric prefix. On the same line as this prefix is a token that identifies what type model or computer is being loaded with software. A token is an alphanumeric string that is used to uniquely identify a model or FIO to the download system.

A master token file resides on each of the file servers 100a–100h located on the network 110 to which the simulation computer 200 is connected. This master token file can be any type of data file that contains identifiers, or tokens that represent the different models of computers manufactured. Associated with each token in some format are the executable files, or batch files, necessary to load a particular model of computer with application software.

The master token file is then copied to a local drive on the simulation computer 200. An initiation process creates a batch file that contains a sequence of instructions that will perform all necessary steps in order to install the software indicated by the information in the electronic traveler. This process uses information from the electronic traveler and the master token list to dynamically create the main batch file. It retrieves out of the electronic traveler the model type. It retrieves out of the master token list the file names necessary to create the main batch file that is to reside locally on a target computer. This main batch file is dynamically created to install software on the exact target computer that was ordered.

A batch file is an executable program that contains commands. In this instance, the specific commands included in the main batch file are dictated by the model of computer indicated for the software download. In the manufacturing arena the source code responsible for downloading software to a target computer is dynamically selected from an entire library of such routines and uniquely combined to match the target computer. An indicator in the electronic traveler and the master token file provide to the system the information necessary to build the executable responsible for downloading the software to the target computer. This batch file is the computer code that is examined by the interpretive element of this invention. Creating the batch file in the lab environment duplicates identically the batch file's creation in the manufacturing environment. The same dynamic batch file that is responsible for downloading software to the target computer is created in both the manufacturing and test environments. In the lab environment the same action is performed resulting in an executable file that, if executed, would download to a target unit the required software. However, this batch file is not executed in the lab environment. This file is interpretively simulated.

Figure 3:
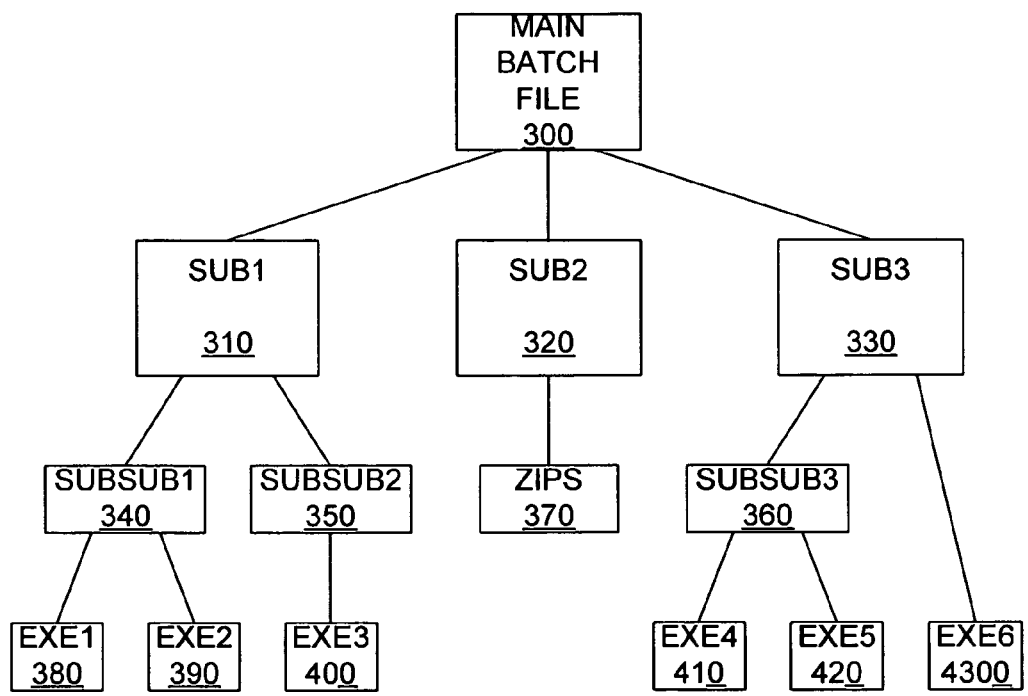

The main batch file execution tree is diagrammed in FIG. 3. The top level indicated in the software tree is the dynamically created batch file 300. As the batch file is executed line by line, scripts or sub-batch files are executed. These are indicated in FIG. 3 as 310, 320 and 330. As each sub batch file 310, 320, or 330 completes its execution, control is returned to the calling batch file. Most of these scripts or sub-batch files are, from a maintenance or development standpoint, static or non-dynamically generated code. These procedures are stored on one of the file servers 100a–100h. The execution of the main batch file begins a recursive process in that scripts, sub-batch files or procedures called by the initial batch file, in turn, can call other programs, procedures, scripts or sub-batch files, for example sub1 310, sub2 320, and sub3 330. The sub batch files can call further procedures such as subsub1 340, subsub2 350, and subsub3 360. If application software is requested, the scripts are responsible for downloading to the target computer the appropriate compressed application software and a means of decompressing.

Once the application software is downloaded to the target computer and decompressed, the main batch file then manages a clean-up process to remove temporary files using cleaning scripts and sub-batch files. The result upon completion is that application software ordered by the customer is downloaded from one of the servers to a target computer and the target computer is left clean except for the software ordered by the customer.

In order to determine the integrity of this download process, the simulation processes each line in each dependent sub batch file 310, 320, 330, procedure or script called by the main batch file. As each call to a sub batch file is encountered, that sub batch file is processed before continuing with the next line in the main batch file.

Batch files flow using conditional statements and GOTO commands. Each GOTO command must have an accompanying label in order to for the batch file to function properly. An independent list of labels is maintained by the simulation for each batch file and sub batch file called during the manufacturing process. This process tracks real and potential errors in batch file flow control. Each batch file is monitored for several criteria that define good flow control. The label must be used at least once. The label must conform to the operating system's naming and size restrictions. There must be no duplicate labels. Additionally, labels can be made to conform to set naming conventions. For example, use of upper and lower case should be used consistently. All of these criteria are checked in seconds by the simulation program, which automatically does what would take several engineering man-hours to do manually.

The simulation models the management of the limited resources of the target computer. Resources include but are not limited to such concepts as environment variable space and disk space. As lines are encountered that modify the values in batch language's environment variables, the simulation updates an internal list of environment variables and their contents. It tracks and accounts for environment variables set and unset in this process. This process tracks real and potential errors in environment variable usage. If an environment variable is set and never used a warning is issued. If one is used but never set a fatal error is issued. As the simulation runs, it monitors the total memory that would be used by environment variables and issues warnings or errors when the amount of available memory during execution would run low or be exceeded.

Simultaneously, with the aforementioned functions, the simulation process maintains a disk space log for each disc in the target system. As files are downloaded to the target computer disk space is used. If all the disk space on the floppy disc drive is used, a partition is created on the hard drive so that there will be enough memory to load all requisite software. In the simulation of this process, this software invention tracks the memory allocated and the memory freed in this process both on the hard drive and the floppy drive. The simulation monitors the upper bounds of memory and disk space requirements, monitoring peak usage and how much is still allocated when the download process passes control back to the manufacturing process that called it.

The simulation determines error reporting integrity. As each program is called, certain error information like return codes or error files can be created. In a unique manufacturing environment using a plethora of programs written internally or developed by customers, vendors or others, no consistent rules can be applied to every program. But, using a configuration file maintained by the software engineer, standard error conventions available through the operating system can be checked for selected programs, as needed. This lets the engineer enforce unique and inconsistent error reporting needs in a consistent manner, far faster and with greater thoroughness than could be achieved manually.

The simulation further tracks network integrity. Network architecture will not only vary from one assembly line to another, but the same line will vary from day to day as typical maintenance will re-configure a network due to growth, scheduled maintenance, hardware failure, etc. The software engineer can describe the network in the simulation's configuration files as these changes occur. The examination of the network lets the simulation check to ensure that all mirrored copies of every file involved in the download system are up to date. The chief examples are for the detection of missing files, out of date files or corrupt files. By accomplishing this in seconds, the download test that follows can be assured of achieving the same results no matter what specific file server it is performed on. This typically results in a reduction in test time of over eighty percent.

The simulation explores and analyzes the required MIS systems. One of the problems that occurs when many MIS systems must communicate with each other continuously on a constantly changing product line, is that they must implement some changes concurrently or massive system failures result. A failure of this type could result in test data on thousands of target computers being lost or causing a line stoppage by the inability of the line to input the necessary data. By checking the MIS systems that interface to the download system being examined, errors can be caught before releasing to the manufacturing floor.

Lastly, the simulation software creates reports that detail problems encountered during the interpretive simulation. These reports are used to address various problems that might be encountered on the manufacturing floor before time consuming tests of the download software are performed that would otherwise be needed to discover such potential problems.

Figure 4:
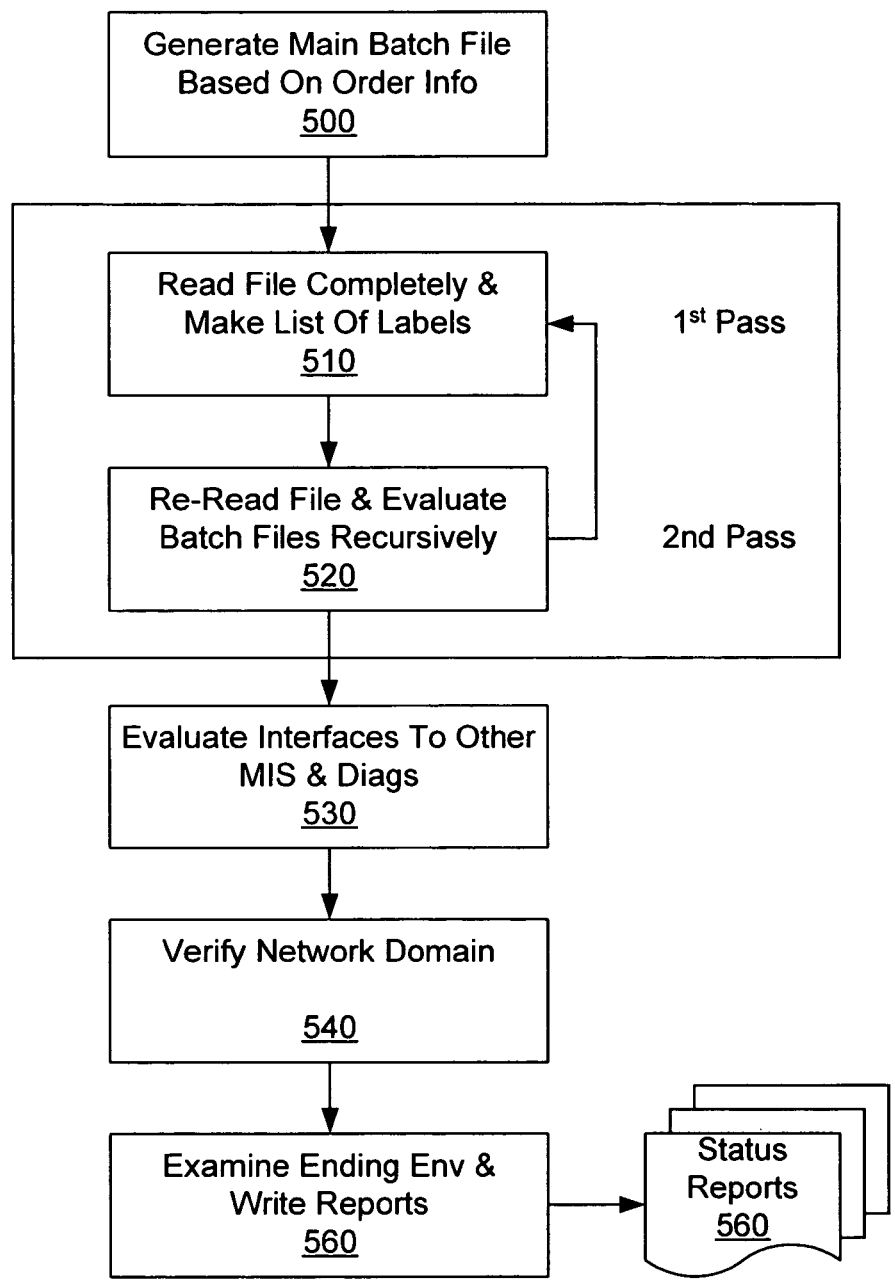

The steps that comprise the method and system of the present invention are described in FIG. 4. The first step in the process of simulating a software download is generating the Main Batch File Based On Order Info 500. This can be accomplished in many ways known in the art, including but not limited, to manual creation of a batch file created by a person typing into a file on a computer those commands required to be executed to download the requisite software to a target computer. A preferred manner of creating this batch file is by running a stored process that identifies the model type of a computer being configured. The identification of the specified model is determined by data contained in the electronic traveler. The process then searches the master token file to determine what subroutines must be executed in order to meet the required specifications.

Once the batch file 500 is created for the model type of computer the software loading of which is being simulated, the next step is to read the file and make a list of labels 510 employed in the batch files to determine the batch file flow integrity. For example, one type of label is a GOTO statement. This invention determines that a GOTO statement has a corresponding line to which to begin as indicated by the number or label following the GOTO statement.

Once the main batch file flow integrity is confirmed, the next step in the method is to read the main batch file again, recursively determining the integrity of each sub batch file 520 called by the main batch file. An example of a possible software tree that is being simulated is indicated in FIG. 3. In applying the system and method of this simulation to this software tree, the main batch file 300 is analyzed for flow integrity in step 510. Once 510 is accomplished, the next step is to evaluate the sub batch files 310, 320 and 330 which involves repeating step 510 with respect to each of the sub batch files. This process continues until the integrity of each of the batch files in the software tree is evaluated.

The next steps involve evaluating interfaces to other MIS and Diagnostic Systems 530, verifying network domain 540, and examining the ending environment 550.

Figure 5:
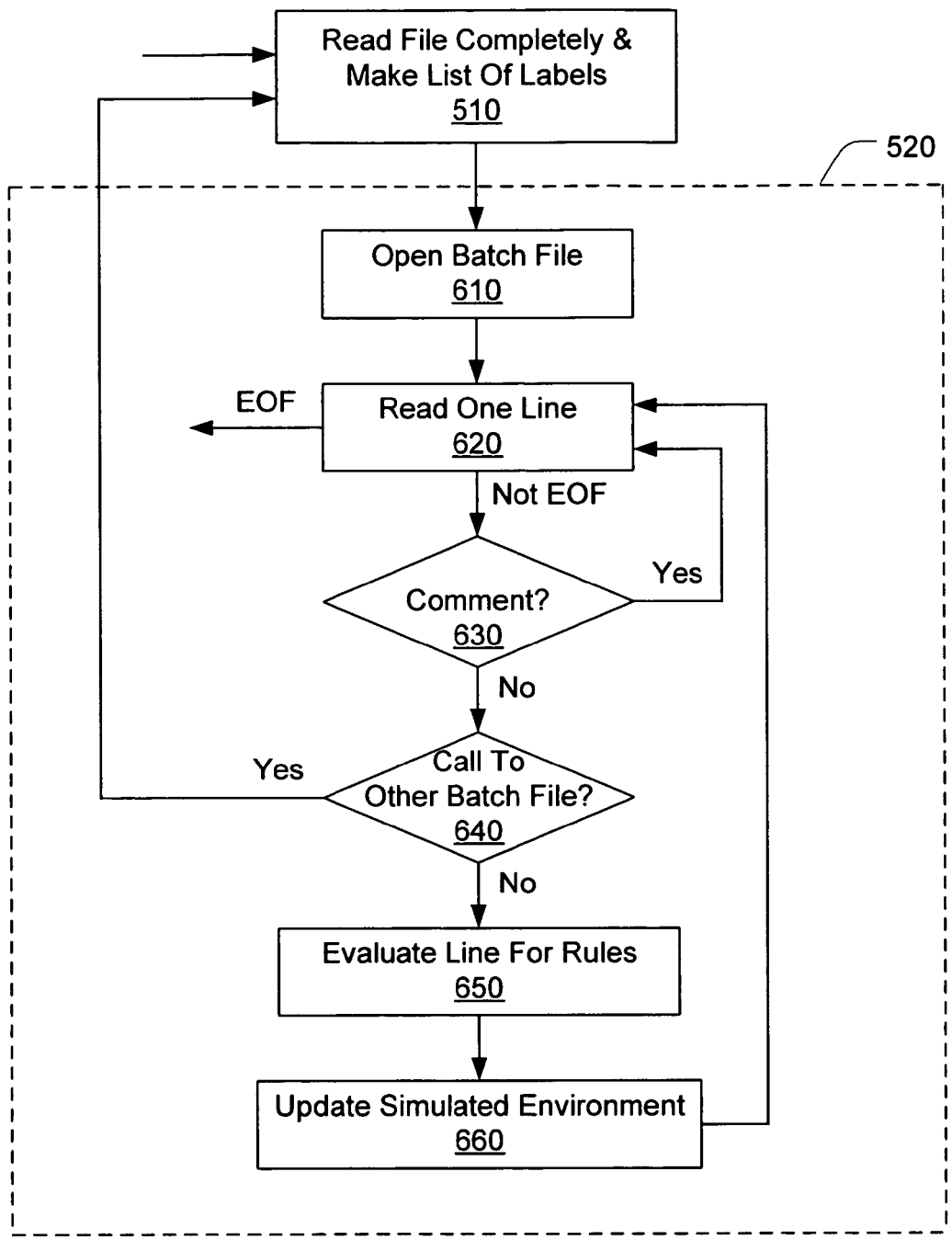

The recursive method step 520 of evaluating each batch file is further described in FIG. 5. Each line of each batch file simulated is read in 620. If the line is a comment, as opposed to a command, the next line is read 630. If the command being evaluated is a call to another batch file, the batch file being called from the batch file currently being simulated is read and the process creates a list of labels used in the batch file being called 510. If the line currently being simulated is neither a comment nor a call to another batch file, the line is evaluated according to internal system rules 650.

Internal rules contain information necessary for the program to determine whether a line in a batch file will execute successfully. For example, a line in a batch file may command the system to execute a file. If the file is downloaded to the system in a zipped format, the simulation determines that the file is zipped, then insures that the corresponding unzip utility is also located on the system so that the file can be executed. Another example of the application of internal rules is a line that sets an environment variable. The simulation uses internal rules to determine that the environment variable is set to an acceptable value dictated by the system.

Once the internal rules are applied to each line in a batch file, the simulation updates the environment accordingly 660.

It will be apparent to those skilled in the software development art as applied to manufacturing that various modifications and variations can be made to the present invention without departing from the spirit and scope of the invention. For instance, the system and method of the present invention can be employed in industries other than the personal computer manufacturing industry. Moreover, those of ordinary skill in the art will recognize that various computer programming languages could be used to construct the system and method of the present invention. Thus, it is intended that the present invention cover the modifications and variations of this invention provided they come within the scope of the appended claims and their equivalents.

The invention claimed is:

1. A method of testing a process that downloads and installs customer ordered software onto a target computer, the method comprising:
   a. dynamically generating on a simulation computer a file that includes instructions that when executed launch a process of downloading and installing on a target computer customer ordered software, including a combination of files from a library that include source code responsible for downloading the customer ordered software onto the target computer;
   b. simulating execution of said dynamically generated file through recursive evaluation procedures and in accordance with a set of evaluation rules to determine which of the combination of files from a library would be executed during a computer manufacturing process and interpret the outcome of the execution of said dynamically generated file;

c. simulating a computer manufacturing environment within which the combination of files from the library run and interact;

d. analyzing the outcome of the simulation of the execution of said dynamically generated file to determine possible syntax errors and possible flow errors.

2. A method as in claim 1 wherein said dynamically generated file is a main batch file created from a static text file that indicates the model type of the target computer, a lookup file that indicates the necessary instruction required to be executed for the model type indicated, and a process that reads the model type from said static text file and creates said dynamically generated file by reading said lookup file to determine command components.

3. A method as in claim 2 wherein said main batch file contains one or more labels identifying the flow of the process, one or more commands containing instructions to be executed and one or more calls to one or more static batch files.

4. A method as in claim 3 wherein the process of simulating said dynamically generated batch file comprises a recursive evaluation of each of said one or more batch files to determine the outcome of the process.

5. A system of testing a process that downloads and installs customer ordered software onto a target computer, comprising:

a. a simulation computer, including a simulated computer manufacturing environment, that mimics a target computer;

b. a first process for creating a second process that launches a process that downloads and installs customer ordered software onto a target computer, including a combination of files from a library, wherein the library includes source code responsible for downloading the customer ordered software onto the target computer;

c. a third process for examining said combination of files from the library through recursive evaluation procedures and in accordance with a set of evaluation rules to determine which files would be executed in the computer manufacturing environment and interpreting the outcome of simulated execution of the second process;

d. one or more output files that include information relating to the process that downloads and installs customer ordered software onto a target computer.

6. A system as in claim 5 wherein said first process reads a electronic traveler to determine the model of the target computer, looks up in a master token list the model of the target computer and creates from the information in the master token list a second process that is an executable main batch file that downloads and installs customer ordered computer software onto the target computer.

7. A system as in claim 6 wherein said main batch file contains labels, commands and sub batch file calls, said third process interpretively tracks said labels, simulates each of said commands and recursively evaluates each of said sub batch files until the end of the main batch file is reached by said third process.

8. A method as in claim 1, further comprising reporting said syntax errors and flow errors in a readable format.

9. A method as in claim 1, further comprising simulating an entire test process.

10. A method as in claim 1, further comprising analyzing an entire simulated test process.

11. A method as in claim 1, further comprising simulating a download process.

12. A method as in claim 1, further comprising simulating a chip programming process.

13. A method as in claim 1, further comprising determining what an outcome of a hypothetical execution would be in a specific simulated environment.

14. A method as in claim 1, further comprising taking less than one hour to perform said dynamically generating, said simulating execution, said simulating an environment, and said analyzing the outcome of the simulation.

15. A method as in claim 1, further comprising cleaning up errors to facilitate code re-use.

16. A system as in claim 5, further comprising an expert tool for facilitating management of software libraries responsible for testing many computers per day.

17. A system as in claim 5, wherein the second process facilitates examination of batch files in a simulated environment.

18. A system comprising:

a means for dynamically generating on a simulation computer a file that includes instructions that when executed launch a process of downloading and installing on a target computer customer ordered software, including a combination of files from a library that include source code responsible for downloading the customer ordered software onto the target computer;

a means for simulating execution of said dynamically generated file through recursive evaluation procedures and in accordance with a set of evaluation rules to determine which of the combination of files from a library would be executed during a computer manufacturing process and interpret the outcome of the execution of said dynamically generated file;

a means for simulating a computer manufacturing environment within which the combination of files from the library run and interact;

a means for analyzing the outcome of the simulation of the execution of said dynamically generated file to determine possible syntax errors and possible flow errors.

19. A system as in claim 18 wherein said dynamically generated file is a main batch file created from a static text file that indicates the model type of the target computer, a lookup file that indicates the necessary instruction required to be executed for the model type indicated, and a process that reads the model type from said static text file and creates said dynamically generated file by reading said lookup file to determine command components.

20. A system in claim 18 wherein said dynamically generated file includes one or more labels identifying the flow of the process, one or more commands including instructions to be executed and one or more calls to one or more static batch files.

* * * * *